Patented Feb. 26, 1952

2,587,329

UNITED STATES PATENT OFFICE 2,587,329

AMIDES OF ALKYLENIMINES AND β-KETO ACIDS AND PROCESS OF PRODUCING THE SAME

Giffin D. Jones, Easton, Pa., assignor to General Aniline & Film Corporation, New York, N. Y., a corporation of Delaware No Drawing. Application December 5, 1946, Serial No. 714,147

4 Claims. (Cl. 260—239)

1

The present invention relates to novel monomeric and polymeric products and to the process of producing them, which comprises acylating an alkylenimine or polyalkylenimine with an acylating agent containing an oxocarbonyl group in the acyl residue.

It has been found that a wide variety of polymeric products may be obtained by acylating a polyalkylenimine with an acylating agent containing an oxocarbonyl group in the acyl residue or by first acylating a monoalkylenimine with an acylating agent of this type and then polymerizing the thus-obtained reaction product. As more fully described hereinafter, the particular properties of the novel products obtained in accordance with the present invention will vary, both with the particular alkylenimine which may be used as a base material and to a greater extent, with the specific acylating agent which may be employed and the relative proportions of alkylenimine and acylating agent.

The same type of polymeric product appears to be obtained in any particular case, whether a monoalkylenimine or a polyalkylenimine is employed as starting material and therefore, either monoalkylenimines or polymers thereof may be employed. Both the monoalkylenimines and the polyalkylenimines react readily with acylating agents and by employing an acylating agent (which contains an oxocarbonyl group in the acyl residue) in the acylating reaction, the novel products of this invention are readily obtained. Suitable acylating agents adapted for use in practicing the present invention are the 1-butene-1,3-diones, examples of which are 1-butene-1,3-dione, 2,4-dimethyl-1-butene-1,3-dione, 2,4-diisopropyl-1-butene-1,3-dione, 2,4-di-n-butyl-1-butene-1,3-dione, 2-n-butyl-4-methyl-1-butene-1,3-dione, 4-n-butyl-2-methyl-1-butene-1,3-dione, 2-n-hexyl-4-methyl-1-butene-1,3-dione, 4-n-hexyl-2-methyl-1-butene-1,3-dione, 4-n-decyl-1-butene-1,3-dione, 2,4-di-n-hexyl-1-butene-1,3-dione, 2,4-di-n-decyl-1-butene-1,3-dione, 2,4-di-hexadecyl-1-butene-1,3-dione, 2,4-diphenyl-1-butene-1,3-dione, 2,4-di-(7,8-hexadecenyl)-1-butene-1,3-dione. The 1-butene-1,3-diones are of the general formula

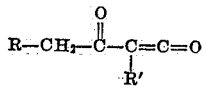

wherein R and R' are hydrogen or hydrocarbon radicals which may be aliphatic or aromatic.

2

Examples of alkylenimines which can be employed in this invention include aziridine (ethylenimine), 2-methylaziridine (propylenimine), 2-ethylaziridine (butylenimine), 2,3-dimethylaziridine, 2,2-dimethylaziridine, 2,2,3-trimethylaziridine, 2,2-dimethyl-3-propylaziridine and the like and polymers thereof.

The acylation reaction is exothermic and proceeds readily on mixing, at room temperature, an alkylenimine such as one of those mentioned above with an acylating agent containing an oxocarbonyl group in the acyl residue, such as one of those mentioned above.

In the event that polyalkylenimine is employed as one of the starting materials, the novel polymeric products of this invention are obtained directly as a result of the acylation reaction. However, if a monoalkylenimine is employed as one of the starting materials in practicing this invention, there is first formed as an intermediate a novel acylated monoalkylenimine reaction product which is, however, readily polymerizable to the polymeric alkylenimine reaction product. The probable course of the reaction empolying a 1-butene-1,3-dione with both a monoethylenimine and polyethylenimine as starting materials, by way of example, is indicated schematically by the following equation:

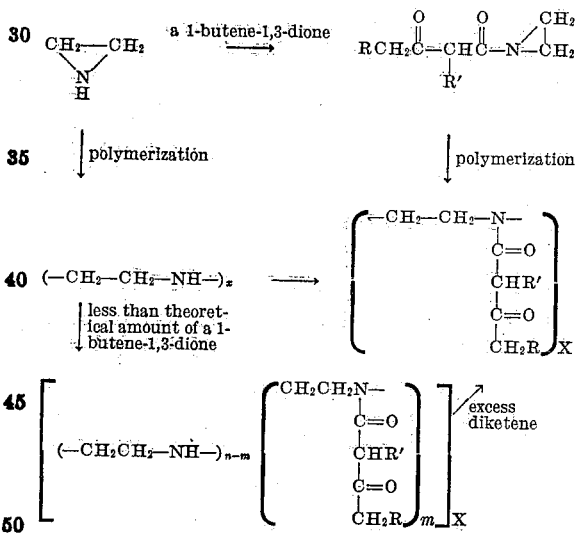

The products of this invention are amides of monomeric or polymeric alkylenimines and betaketoacids and are of the probable general formulae:

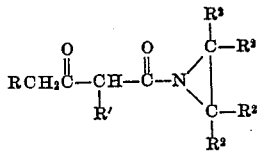

Monomeric alkylenimine acylated with a beta-ketoacid

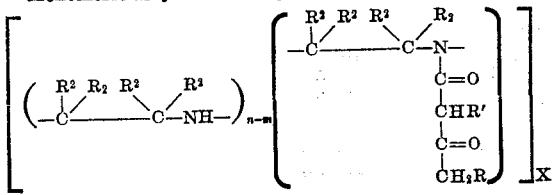

Polymeric alkylenimine partially or completely acylated with a beta-ketoacid wherein R and R' are as defined above, $R^2$ is hydrogen or lower alkyl, such as methyl, ethyl, propyl, etc., $m$, $n$ and X are integers and $m$ is equal to or less than $n$.

The following specific examples illustrate the present invention:

Example 1

To a solution of polyethylenimine (3 g.) in 25 cc. of water was added 0.5 cc. diketene. On agitation, the diketene dissolved and the solution became warm (40–50° C.) over a few minutes. The solution was chilled in ice water and almost at once a stiff, clear, colorless gel formed. This gel could be washed with water at room temperature without dissolving. On heating to about 75° C., it melted to a syrupy solution and regelled on cooling to about 65° C.

The thus-obtained gel was of interest as a gelatin substitute and a gelatin extender in the formation of silver halide photographically-active emulsions, since it does not reduce silver halide and does exert great solvent action or restraining power on silver halide. This was evidenced by dissolving 5 g. of the above gel in 45 cc. of warm water, to which was then added 1 cc. of 0.1 N potassium bromide and 1 cc. of 0.1 N silver nitrate. The solution remained clear even after heating for 15 minutes at 75° C.

The thus-obtained gel was also of interest for the formation of azo dyestuffs. A 2 g. portion of the gel was readily dissolved in 30 cc. of water and dilute ammonia was then added. On treating the solution with an aqueous solution of dianisidine diazonium chloride-zinc chloride complex, a dark yellow color was obtained. A control in which the dianisidine diazo compound was added to dilute ammonia gave only a light yellow color. This indicates that the yellow dye obtained on treating the gel was of azo structure rather than diazo amino structure, since it was stable to acid and the reaction, therefore, probably occurred on the active methylene groups rather than the secondary amino groups.

The gel is also capable of azomethine formation and is, therefore, of interest for use in color photography. A 5 cc. portion of the gel was added to 30 cc. of standard color developer mix and on treatment with potassium periodate a yellow dye was immediately formed which gave a color quite similar to that produced by aceto-acetanilide.

Example 2

To 180 cc. of an aqueous solution containing 20 g. of polyethylenimine was added slowly 37.5 cc. of diketene during the course of ½ hour, during which time the temperature of the reaction mixture rose to 75° C. The reaction mixture was kept alkaline by the periodic addition of 40% aqueous sodium hydroxide. Upon cooling to room temperature, the solution did not gel. The polymer is gelled by adjusting the pH of the solution to 6 with acetic acid and adding a 2% aqueous solution of the dihydrazide of adipic acid which had been acidified with acetic acid.

Example 3

To 50 cc. diketene which was mechanically stirred in a flask with a good condenser was added from a dropping funnel monomeric ethylenimine. The reaction was exothermic and instantaneous and a cooling bath was used to keep the temperature below 60° C. At the close of the reaction, which required 1½ hours, the visible heat evolution was much less as the drops of ethylenimine were added. The odor of the fluid, yellow reaction mixture was that of diketene. Suddenly, polymerization occurred with boiling and ejection of the separatory funnel. The polymer remained as a red sponge from which a brown solution could be obtained by leaching with water but which was largely insoluble in water. A water-soluble polymer can be obtained by carrying out the reaction at a lower temperature.

From a comparison with Example 1 above (in which less than the theoretical amount of diketene was employed) with Examples 2 and 3 (in which an excess of diketene was employed so that the ethylenimine was completely acylated), it will be noted that a thermo-reversible gel was obtained where the acylated polymer contained free amino groups, while in the case of the completely acylated product which contained no free amino groups, the product did not have the property of forming a thermo-reversible gel. While the exact mechanism for the gelation has not been definitely established, it is believed to be through a reversible cross-linking through free secondary amino groups, as indicated by the following equation, using by way of illustration the gel obtained in Example 1 in which less than the theoretical amount of diketene is employed.

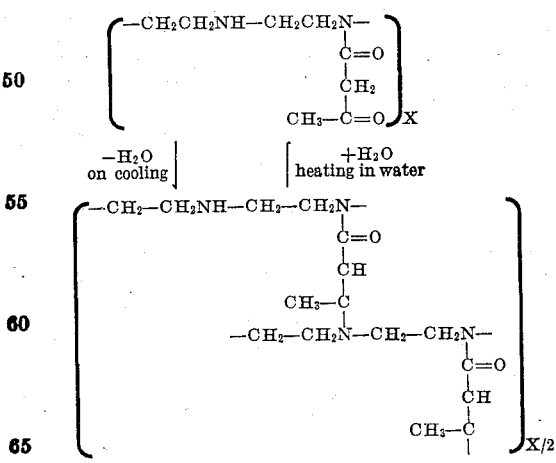

wherein X is an integer. By proper selection of the alkylenimine and the acylating agent containing an oxocarbonyl group and the relative proportions of the reactants, the solubility and gelling properties of the resulting product may be quite accurately controlled. Thus, the products of this invention vary from water-soluble to water-insoluble polymeric amides in which from 5 to 100% of the secondary amino groups are acylated with a 1-butene-1,3-dione. Water-soluble products are generally obtained when a water-soluble polymeric alkylenimine is acylated with a lower molecular weight 1-butene-1,3-dione such as diketene. Many of the water-soluble polymeric amides which are not completely acylated exhibit the phenomenon of thermoreversibility, whereas the water-soluble polymeric amides to a higher degree or completely acylated are not thermoreversible. These polymeric amides can be gelled by the addition of a gelling agent as illustrated in Example 2. The polymeric amides are water-insoluble if the product is of too high a molecular weight or if the polymeric amide is prepared from a higher molecular weight alkylenimine or a high molecular weight 1-butene-1,3-dione.

The products of this invention, particularly those which can be soluble, are capable of azo and azomethine formation by virtue of their containing an activated methylene group. The insoluble products can be molded and are of interest for the preparation of a variety of molded articles.

I claim:

1. The process of producing a water-soluble thermo-reversible gel-forming material, which comprises acylating a 1,2 alkylenimine with substantially less than an equivalent amount of diketene.

2. The process of producing a water-soluble thermo-reversible gel-forming material, which comprises acylating a monoethylenimine with substantially less than an equivalent amount of diketene, and polymerizing the thus-obtained reaction product.

3. The process of producing a water-soluble thermo-reversible gel-forming material, which comprises acylating a polyethylenimine with substantially less than an equivalent amount of diketene.

4. A thermo-reversible gel-forming material comprising a water-soluble acetoacetamide of a polyethylenimine in which only a minor portion of the secondary amino groups of the polyethylenimine are acylated.

GIFFIN D. JONES.

REFERENCES CITED

The following references are of record in the file of this patent:

UNITED STATES PATENTS

| Number | Name | Date |
| --- | --- | --- |
| 2,222,208 | Ulrich | Nov. 19, 1940 |
| 2,272,489 | Ulrich | Feb. 10, 1942 |
| 2,284,896 | Hanford et al. | June 2, 1942 |
| 2,296,225 | Ulrich | Sept. 15, 1942 |
| 2,339,046 | Bestian | Jan. 11, 1944 |

OTHER REFERENCES

Boese, Ind. Eng. Chem., vol. 32, pp. 16–19 (1940).